No. 750,283. PATENTED JAN. 26, 1904.
F. K. HOOVER & A. J. MASON.
BRAKE FOR HOISTING MACHINES.
APPLICATION FILED MAY 1, 1903.
NO MODEL. 4 SHEETS—SHEET 1.

No. 750,283. PATENTED JAN. 26, 1904.
F. K. HOOVER & A. J. MASON.
BRAKE FOR HOISTING MACHINES.
APPLICATION FILED MAY 1, 1903.
NO MODEL. 4 SHEETS—SHEET 4.

Witnesses, Inventors,
Frank K. Hoover and
Arthur J. Mason,
By Offuld Towler Linthicum
Attys.

No. 750,283. Patented January 26, 1904.

UNITED STATES PATENT OFFICE.

FRANK K. HOOVER AND ARTHUR JOHN MASON, OF CHICAGO, ILLINOIS.

BRAKE FOR HOISTING-MACHINES.

SPECIFICATION forming part of Letters Patent No. 750,283, dated January 26, 1904.

Application filed May 1, 1903. Serial No. 155,188. (No model.)

*To all whom it may concern:*

Be it known that we, FRANK K. HOOVER and ARTHUR JOHN MASON, citizens of the United States, residing at Chicago, in the county of Cook and State of Illinois, have invented certain new and useful Improvements in Brakes for Hoisting-Machines, of which the following is a specification.

In hoisting-machines, more particularly those operated by electricity, it has hitherto been found necessary to provide a brake which will automatically hold the load when the motors are at rest, commonly known as the "solenoid-brake," and also to provide another brake the function of which is to absorb and destroy a certain amount of power when the load is lowered, in order to prevent the motors from running away and the lowering of the load at a dangerous speed.

The object of the present invention is to combine the functions served by these two brakes in a single brake, thereby to that extent simplifying the brake mechanism of such machines.

To this end our invention resides in a novel form of brake for hoisting-machines of the type specified having the peculiarities of construction and mode of operation substantially as hereinafter described, and pointed out in the claims.

Figure 1:
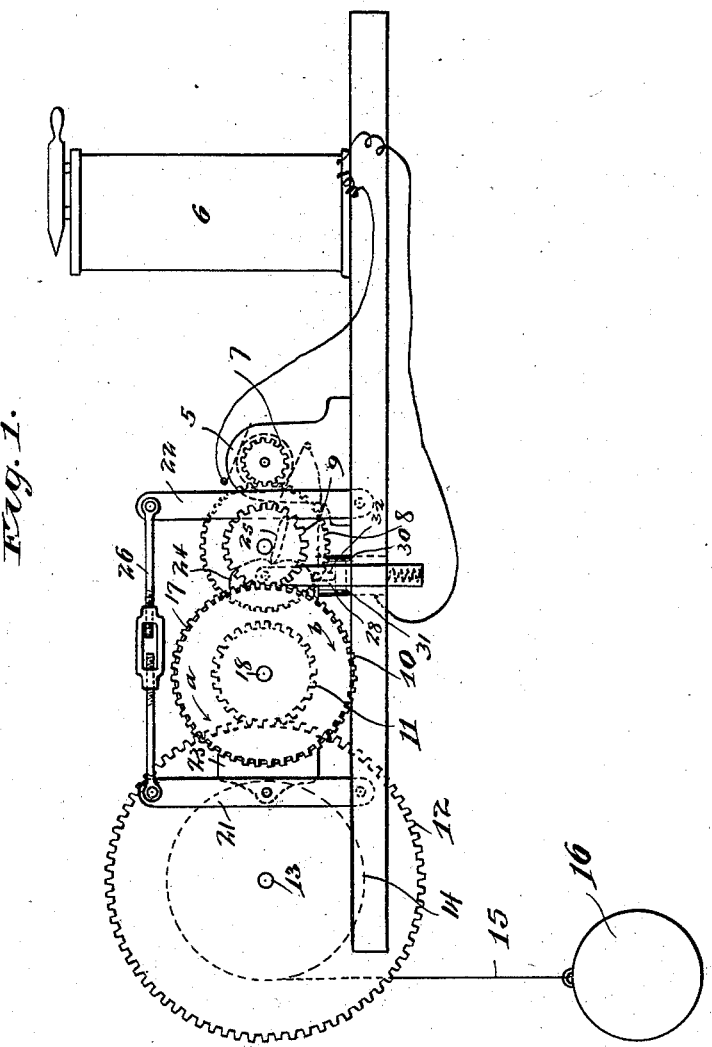
Figure 2:
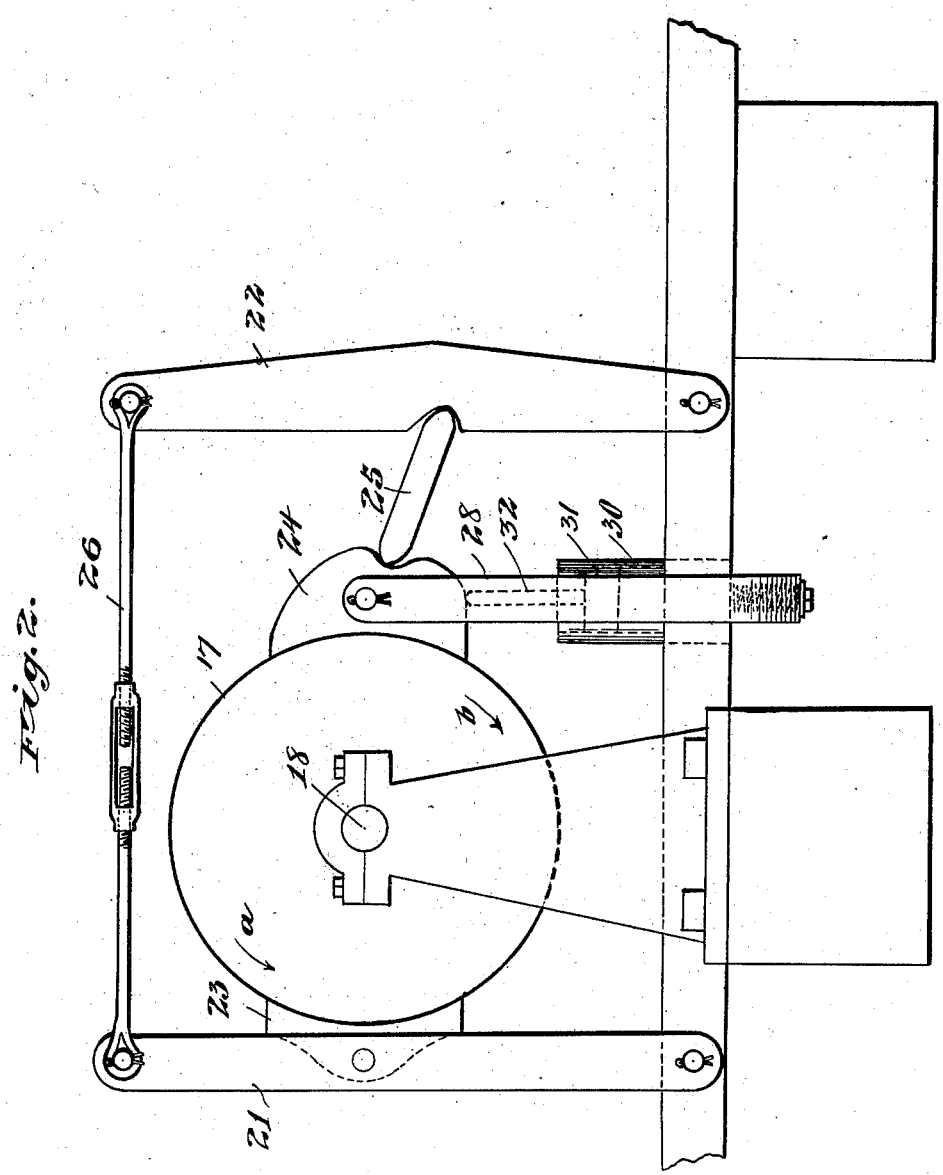
Figure 3:
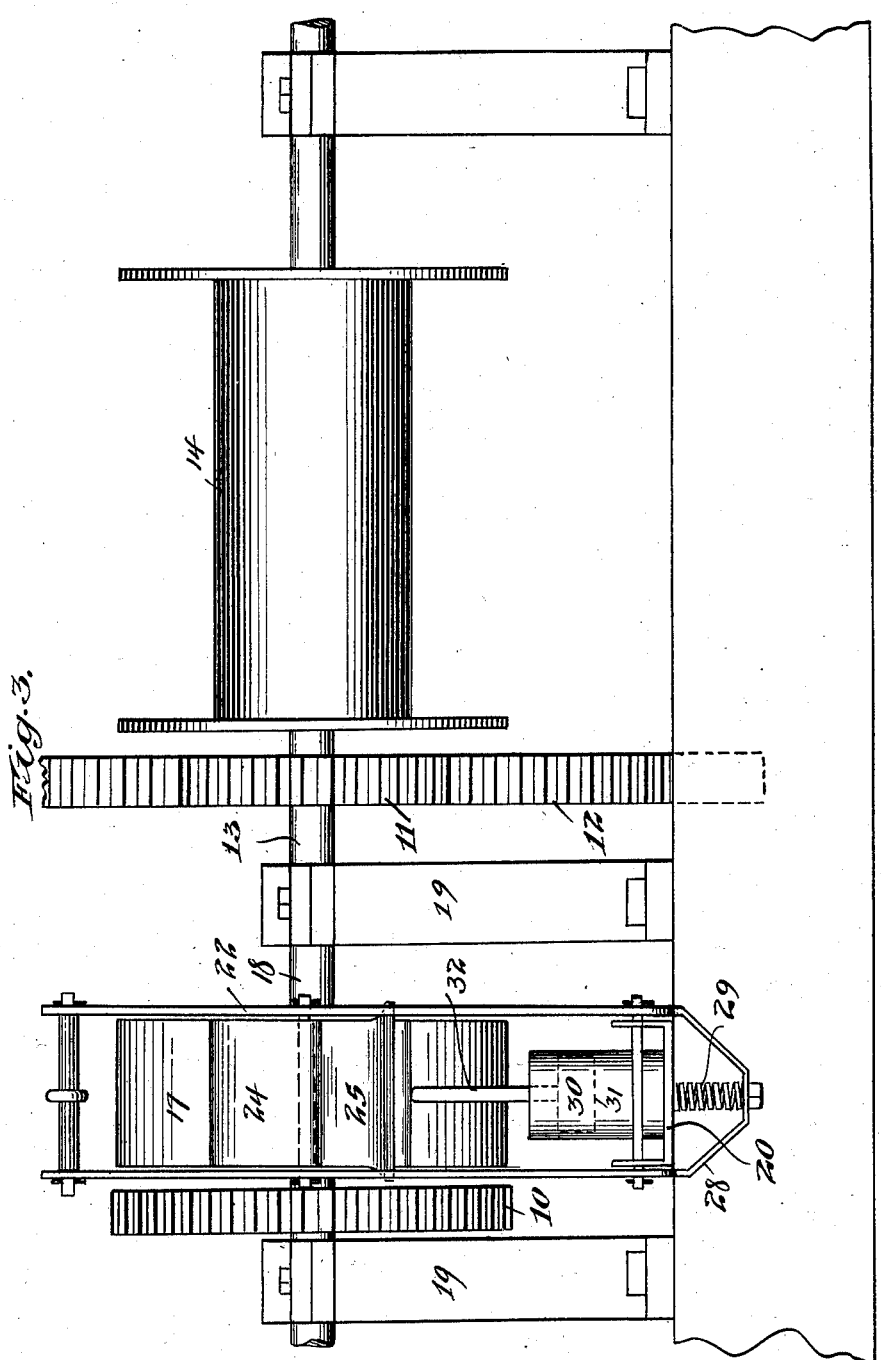
Figure 4:
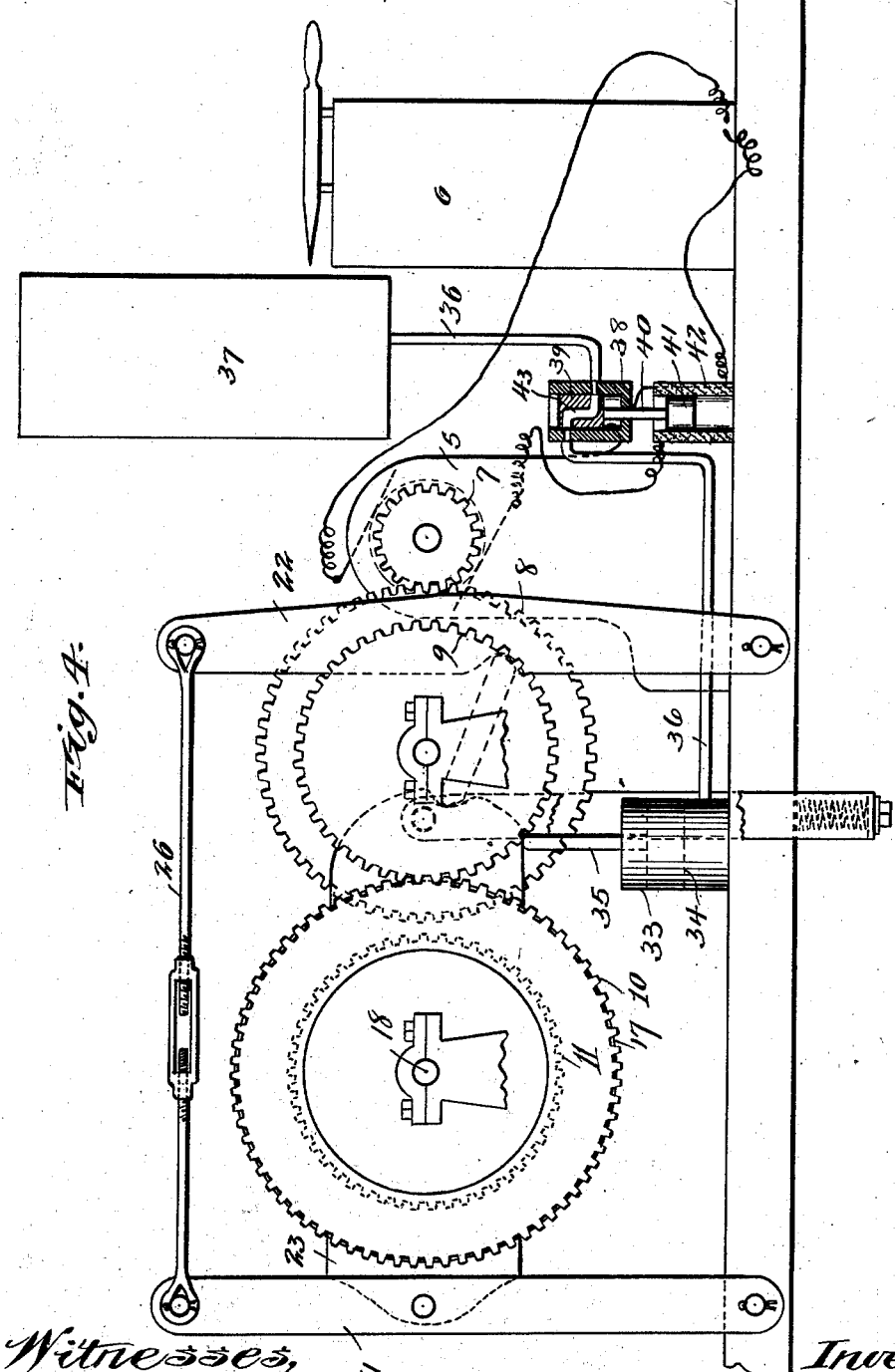

In the accompanying drawings, which illustrate the principle of our invention and an apparatus for carrying the same into effect, Figure 1 is a side elevational view, partly in diagram, of the principal mechanical features of an electric hoisting-machine having our improved brake applied thereto. Fig. 2 is an enlarged side elevational detail of the immediate brake mechanism and the pulley to which it is applied. Fig. 3 is an edge elevational view of the parts shown in Fig. 2; and Fig. 4 is a view similar to Fig. 1, but illustrating a modification in the means employed to counteract the brake-actuating spring during the hoisting of the load.

Referring to the drawings, 5 indicates an electric motor, 6 a controller therefor, 7, 8, 9, 10, 11, and 12 a train of gears of which the last-named gear is keyed fast on a hoisting-shaft 13, provided with a winding-drum 14, which by a cable 15 is adapted to raise and lower a load represented by the weight 16.

Referring to Figs. 2 and 3, 17 designates a pulley keyed on one of the intermediate shafts 18 of the train of gears between the motor and the hoisting-shaft. The shaft 18 is journaled in a pair of standards or pillow-blocks 19, and on each side of the pulley are pivoted at their lower ends to an underlying channel-beam 20 a pair of equalizing-bars 21 and 22. 23 is a brake-shoe, preferably of hard wood, carried by the equalizing-bar 21 and bearing against the periphery of the pulley 17. 24 is another brake-shoe, preferably of the same material, bearing upon the periphery of the pulley 17, diametrically opposite the brake-shoe 23. This brake-shoe 24 is supported in position by means of a back strut 25 in the nature of a toggle-link interposed between the back side of the brake-shoe and the adjacent edge of the equalizing-bar 22, the back strut preferably having pointed ends resting in corresponding notches in the brake-shoe and equalizing-bar, respectively. The upper ends of the equalizing-bars 21 and 22 are connected by a rod 26, provided with a turnbuckle 27 for purposes of adjustment. 28 designates a yoke the upper ends of which are pivoted to the opposite sides of the brake-shoe 24, the depending portion of the yoke extending beneath the channel-beam 20. Between the lower horizontal member of the yoke and the under side of the channel-beam 20 is interposed a coil compression-spring 29, the function of which is to force downwardly the yoke and the brake-shoe attached thereto, and thereby press the latter snugly against the periphery of the pulley 17. It will be observed that the strut 25 and that sector of the pulley lying between the brake-shoe 24 and the pulley-shaft 18 constitute, in effect, two members of a toggle, interposed between which and constituting the knuckle or joint thereof is the brake-shoe 24. 30 designates the coil of a solenoid, which may rest upon the base of the channel-beam 20, the armature 31 of the solenoid having an upwardly-extending stem 32, which abuts against the under edge of the brake-shoe 24. As shown in Fig. 1, the coil of the solenoid is interposed in the circuit of the controller 6. It is obvious, therefore, that the force of the spring effects a powerful pressure of the brake-shoe against the pulley, which pressure rapidly increases and approaches infinity the nearer the two pivotal points of the strut 25 and the geometrical axis of the shaft 18 approach a straight line.

The mechanism is so arranged that in order to lower the load it is necessary to revolve the brake-pulley 17 in the direction indicated by the arrow $b$. This is done against and in opposition to the friction effect produced thereon by the brake-shoe 24, wedged thereagainst by the full force of the spring 29, and it is obvious that if the spring is sufficiently strong the load will remain at rest in the absence of power applied to the shaft 18 to positively rotate it against the effect of the brake 24. Such, in fact, is the operation of the device, the brake 24 counteracting the gravity effect of the load and the power of the motor being exerted to overcome the difference between the opposed effects on the pulley of the load and the brake.

When the load is raised, it is necessary to revolve the pulley 17 in the contrary direction, or as indicated by the arrow $a$. The solenoid 30 is so wound and connected in the circuit that when the controller is set to direct the current through the motor in a direction to effect the revolution of the pulley 17 in the direction of the arrow $a$ the direction of the current is such that the solenoid is thereby energized to raise its armature and through the thrust of its stem 32 on the brake-shoe 24 to annul and offset the tension of the spring 29 and permit the pulley to revolve freely. The actual movement of the solenoid-armature in effecting this is very slight and practically imperceptible to the eye, the movement not requiring to be such as to carry the brake-shoe out of actual contact with the pulley, but simply such as suffices to relieve the friction effect produced by the spring 29. When the current is reversed to lower the load, during which operation the pulley 17 is revolved in the opposite direction, or as shown by the arrow $b$, the solenoid, owing to the reversed direction of the current, is idle and has no effect upon the spring 29, which latter therefore continues to exert a pressure on the brake-shoe, so that the motor must first overcome the resistance of the brake-shoe before the load begins to descend.

It is evident that other means than the solenoid 30 might be employed within the principle of our invention to produce the desired effect upon the brake-shoe when the load is to be raised. In Fig. 4 we have illustrated diagrammatically an arrangement of mechanism wherein the solenoid is replaced by a compressed-air cylinder 33, open at its upper end and equipped with a piston 34, the stem 35 of which abuts the lower edge of the brake-shoe. From the lower end of the cylinder 33 extends a compressed-air inlet and discharge pipe 36, which extends to a compressed-air reservoir 37. Interposed in the pipe 36 is an air-controlling valve, which may be of any type or construction suitable for the purpose and may be operated by any suitable means. As herein shown, this valve consists of a casing or cylinder 38 open at its upper end and containing therein a sliding piston-shaped valve-body 39, having a stem 40, the lower end of which is connected to the armature 41 of a solenoid 42, interposed in the controller-circuit. That section of the air-pipe 36 lying between the cylinder 33 and the valve-casing 38 taps the latter near its upper end, while the other section of the pipe 36 taps the valve-casing on the opposite side thereof at approximately its longitudinal central point. The valve-body 39 has a port 43, which when the valve-body is in its elevated position, as shown, constitutes a connection between the two sections of the air-pipe, thereby admitting compressed air from the reservoir 37 to the cylinder 33 beneath the piston 34 and effecting the lifting action on the brake-shoe 24, the solenoid 42 being so wound as to thus actuate the valve when the controller is set to actuate the motor in a direction to raise the load. When the controller is set to actuate the motor in a reverse direction, the action of the solenoid is reversed, the valve is drawn down, thereby closing off that section of the pipe 36 between the valve and the reservoir and simultaneously opening that section of the pipe 36 between the valve and the cylinder 33 to vent the latter and permit the piston 34 to descend.

It is apparent from the arrangement of the equalizing-bars 21 and 22, as herein shown and described, that both brake-shoes 23 and 24 must press upon the pulley 17 from opposite sides with the same stress. This constitutes a valuable feature in balancing the work of the shaft, avoiding both a tendency to spring or bend the shaft and unequal wear on the journal-boxes supporting the same.

It will be observed as constituting a peculiar result of the toggle-joint character of our improved brake that during the hoisting of the load such slight friction as may exist between the pulley and the wearing-face of the brake-shoe, due to the fact that the latter may rest lightly against the periphery of the pulley, tends to move the links of the toggle in a closing direction, such movement obviously tending to still further reduce the slight friction and braking effect of the brake-shoe upon the pulley; but when the pulley is turned in the opposite direction to lower the load the friction created by the action of the spring 29 between the brake-shoe and the pulley tends to move the arms of the toggle apart or toward a straight line. This effect supplements the effect of the spring 29 in producing the braking action of the brake-shoe upon the pulley and becomes more pronounced and effective the faster the pulley revolves, thus constituting practically an automatic safety device against the possible running away of the machine during the lowering operation. Of course care must be exercised in the preliminary adjustment of the brake-shoe and its toggle arm or strut 25 relatively to the pulley and its axis that the knuckle and the two ends of the toggle are not set too nearly in a straight line, since otherwise the brake-shoe might become, in effect, a wedge effectually locking the pulley against the combined power of the motor and weight of the load to turn it in the lowering operation.

From the foregoing it will be seen that our invention combines in a single brake mechanism the functions of both the solenoid and mechanical brakes heretofore employed and operated separately and independently in electric hoisting-machines. It will be evident that the principle of the invention is not confined to the particular mechanical embodiments thereof herein illustrated and described—as, for instance, the brake-shoe 23 might be omitted entirely, although with less perfect and satisfactory results. Also any other means than those herein shown and described might be employed for counteracting the effect of the brake-actuating spring 29 at the proper times. While we have shown and described the invention as applicable to electric hoisting-machines, it will be evident that it is equally capable of application to hoisting-machines operated by other motive agents. We do not, therefore, limit our invention to its particular application shown and described nor to the detail mechanical features, except to the extent indicated in certain of the claims hereunto appended.

We claim—

1. In a hoisting apparatus, the combination with a motor, a winding-drum shaft and driving connections therebetween, of a brake-pulley mounted on a rotating shaft of the apparatus, a brake applied thereto, means for normally forcing said brake against the pulley, and means actuated by the actuating agent of the motor for counteracting said brake-applying force during the hoisting of the load only, substantially as described.

2. In a hoisting apparatus, the combination with a brake-pulley, of a brake-shoe applied to the periphery thereof, a back strut supporting said brake-shoe against the pulley and constituting one link of a toggle whereof the other link is constituted by a sector of the brake-pulley between its axis and the brake-shoe, means connected to said brake-shoe normally tending to draw the same in a direction to spread the links of the toggle, and means for counteracting said brake-shoe-actuating means during the hoisting of the load, substantially as described.

3. In a hoisting apparatus, the combination with a brake-pulley, of a pair of equalizing-bars pivotally mounted at corresponding ends on each side of said pulley, a connection between the opposite ends of said equalizing-bars, a brake-shoe carried by one of said equalizing-bars and bearing on the periphery of said pulley, a second brake-shoe applied to the periphery of said pulley opposite said first-named brake-shoe, a back strut interposed between said last-named brake-shoe and the adjacent equalizing-bar and constituting one link of a toggle whereof the other link is constituted by a sector of the brake-pulley between its axis and said brake-shoe, means connected to said brake-shoe normally tending to draw the same against the brake-pulley in a direction to spread the links of the toggle, and means for counteracting said brake-shoe-actuating means during the hoisting of the load, substantially as described.

4. In a hoisting apparatus, the combination with a brake-pulley, of a pair of equalizing-bars pivotally mounted at their lower ends on each side of said pulley, an adjustable connecting-rod uniting the upper ends of said equalizing-bars, a brake-shoe carried by one of said equalizing-bars and bearing on the periphery of said pulley, a second brake-shoe applied to the periphery of said pulley opposite said first-named brake-shoe, a back strut interposed between said last-named brake-shoe and the adjacent equalizing-bar and constituting one link of a toggle whereof the other link is constituted by a sector of the brake-pulley between its axis and said brake-shoe, a spring and connections therefrom to said brake-shoe normally tending to draw the latter against the brake-pulley in a direction to straighten the links of the toggle, and means for counteracting said brake-shoe-actuating means during the hoisting of the load, substantially as described.

5. The combination with a brake-wheel and a shaft on which the same is mounted, of a pair of brake-shoes applied to opposite portions of the periphery of the latter, a toggle arm or strut supporting one of said brake-shoes against the brake-wheel, means for drawing said last-named brake-shoe against the brake-pulley in a direction to straighten the toggle, and jointed connections between said brake-shoes whereby the brake-applying force is equally divided between said brake-shoes and the pressure on the shaft equalized, substantially as described.

FRANK K. HOOVER.
ARTHUR JOHN MASON.

Witnesses:
SAMUEL N. POND,
FREDERICK C. GOODWIN.